March 17, 1959    J. C. RABIER    2,878,450
HIGH SPEED MULTI-CHANNEL VOLTAGE INDICATOR
Filed May 23, 1957    7 Sheets-Sheet 2

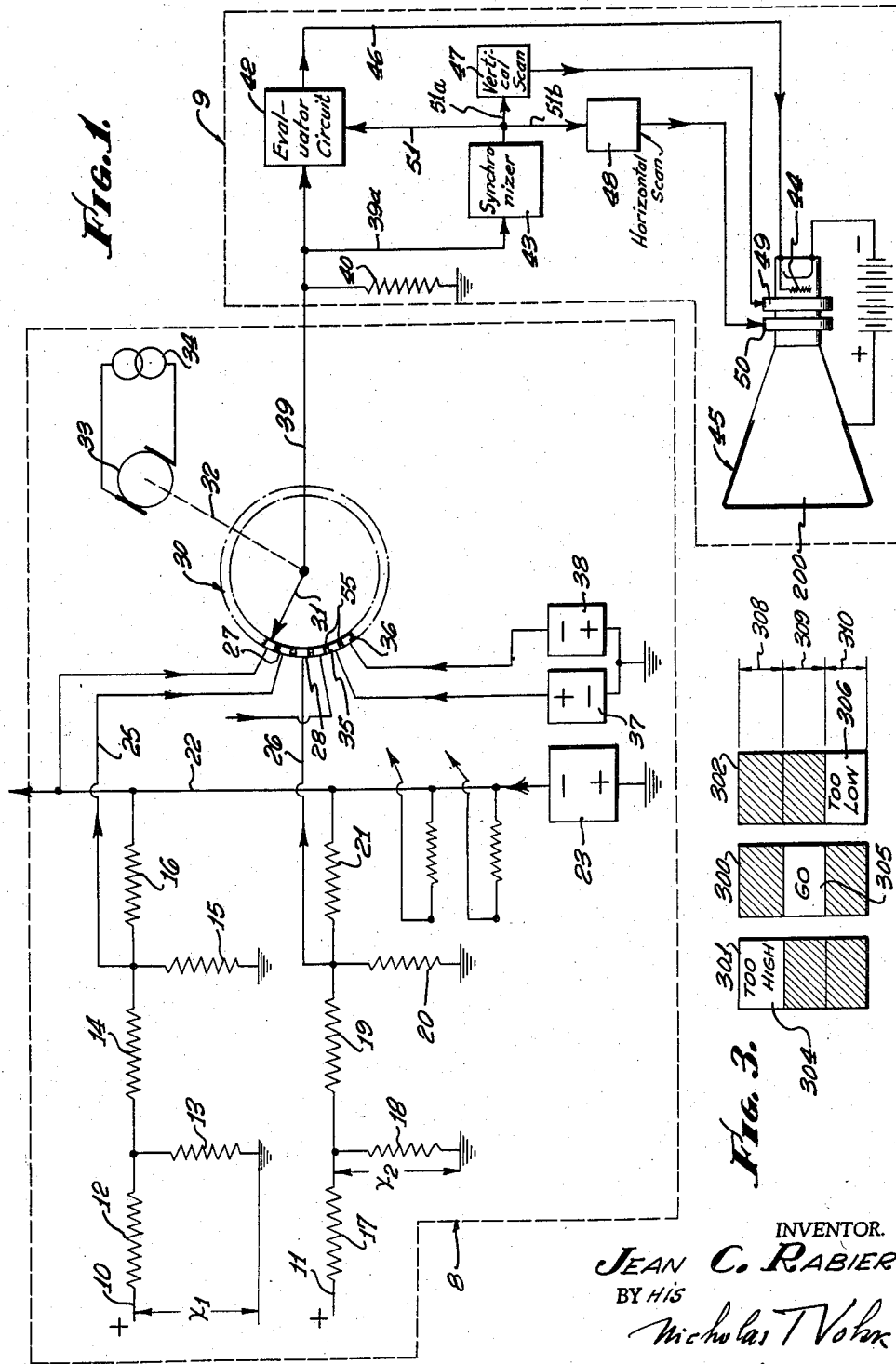

INVENTOR.
JEAN C. RABIER
BY his
Nicholas Vohr
ATTORNEY.

March 17, 1959     J. C. RABIER     2,878,450
HIGH SPEED MULTI-CHANNEL VOLTAGE INDICATOR
Filed May 23, 1957     7 Sheets-Sheet 3

INVENTOR.
JEAN C. RABIER

March 17, 1959 J. C. RABIER 2,878,450
HIGH SPEED MULTI-CHANNEL VOLTAGE INDICATOR
Filed May 23, 1957 7 Sheets-Sheet 4
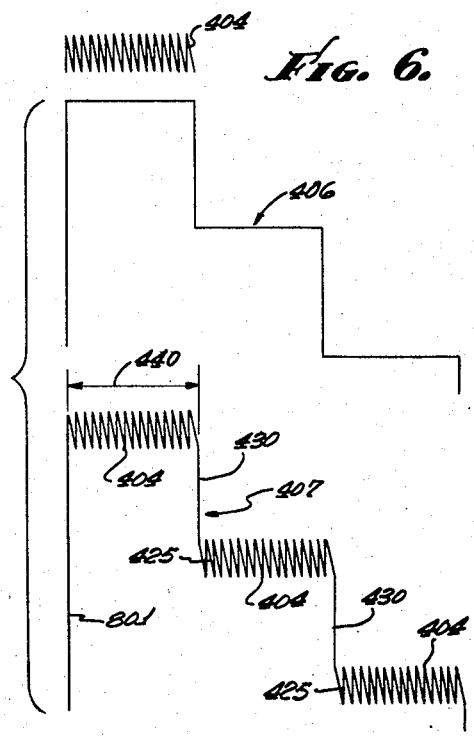
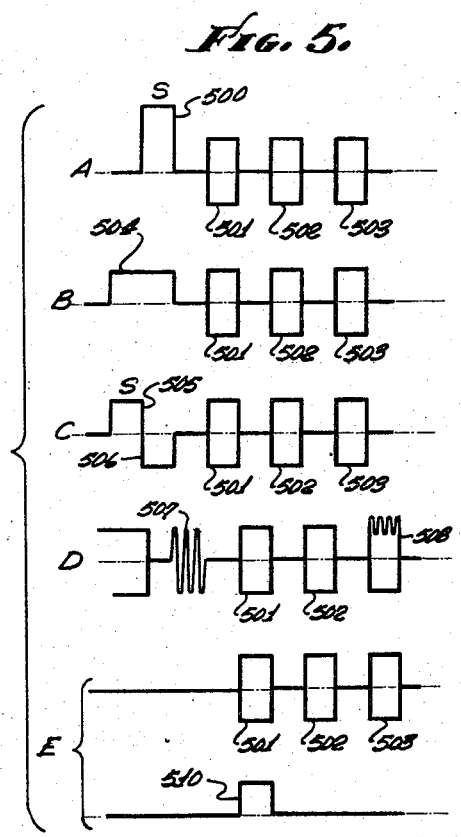
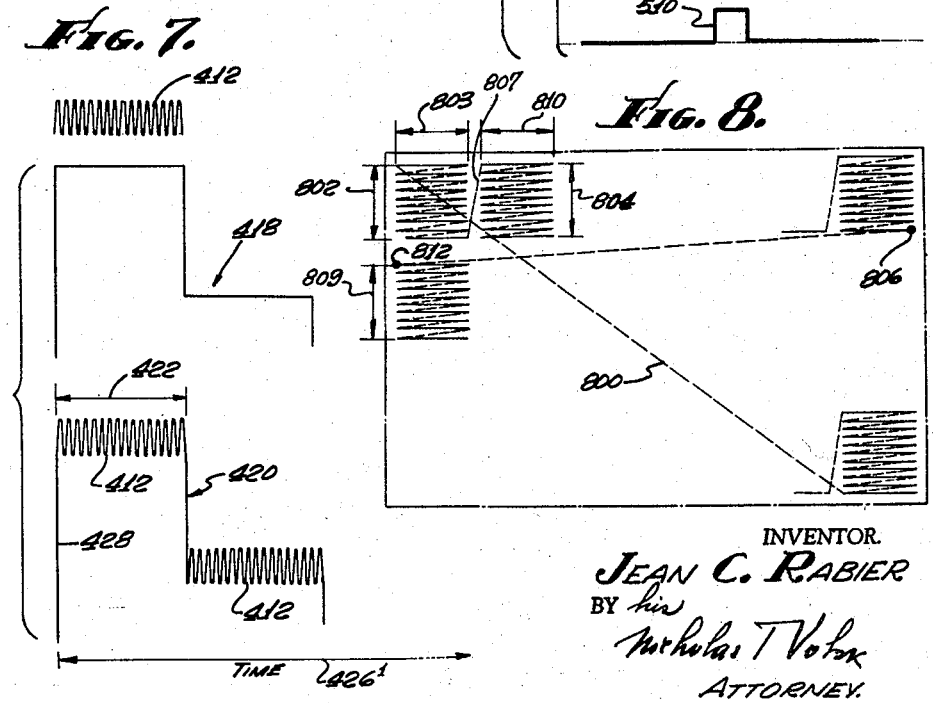
INVENTOR.
JEAN C. RABIER
BY his
Nicholas T Volak
ATTORNEY.

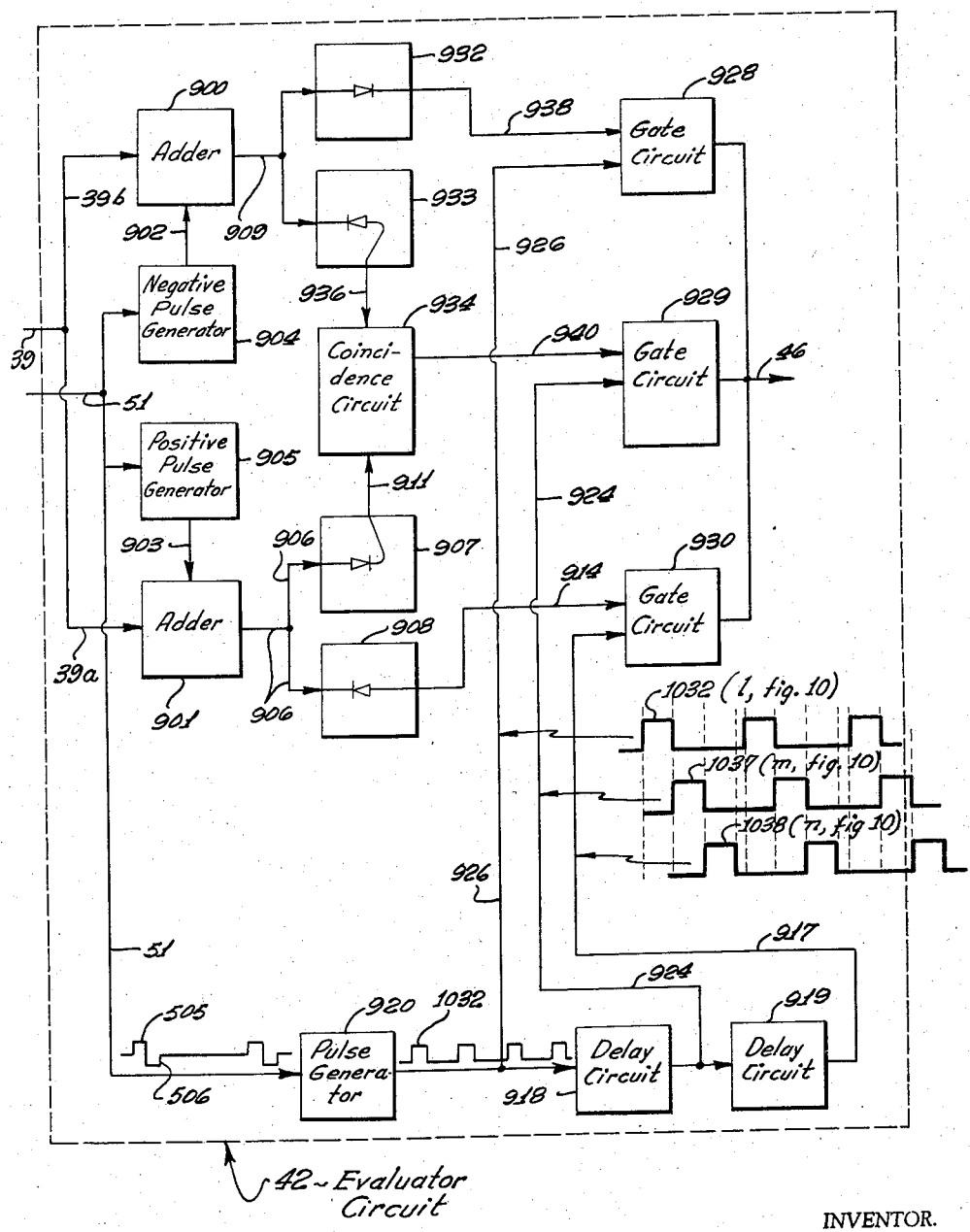

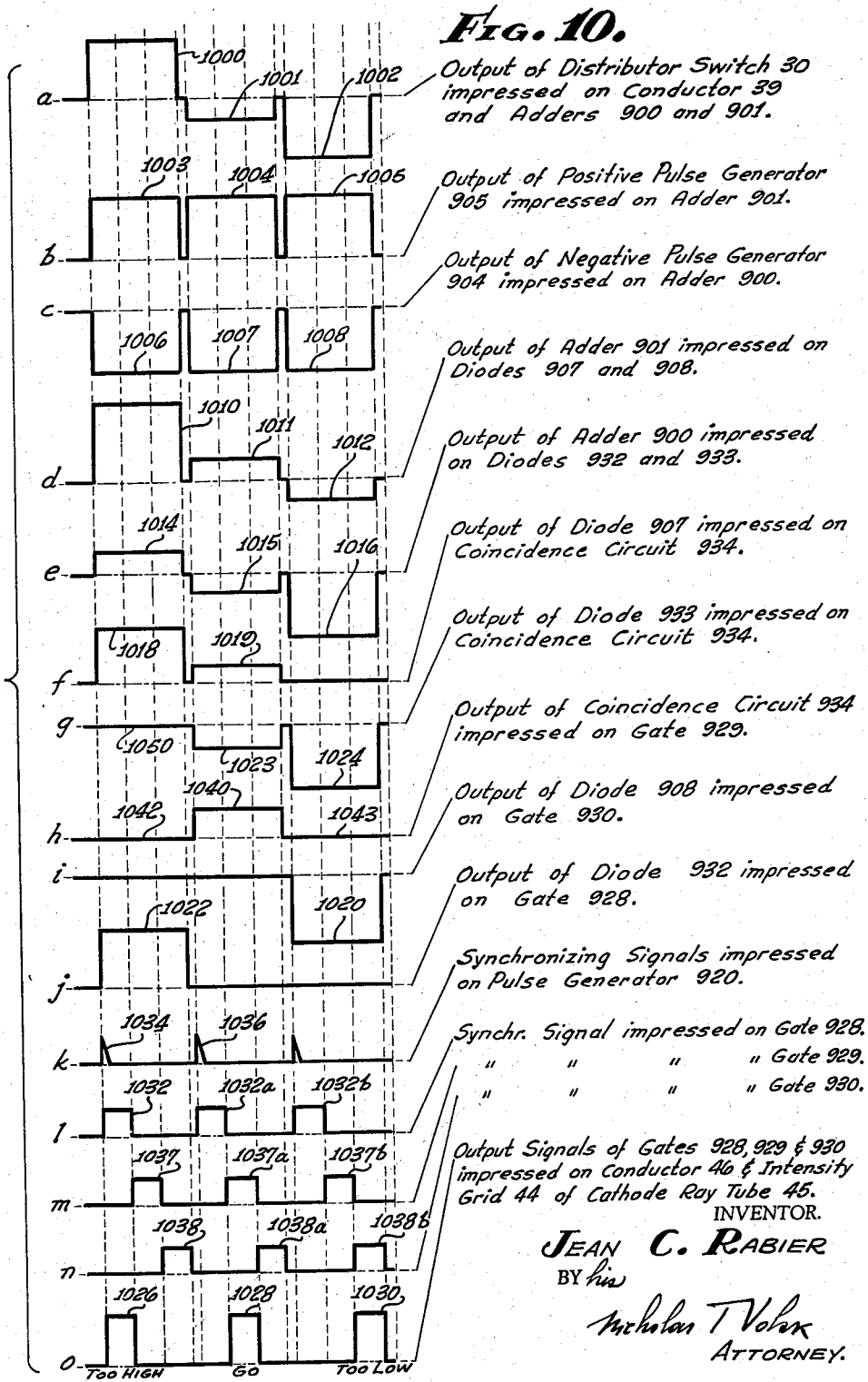

March 17, 1959 J. C. RABIER 2,878,450
HIGH SPEED MULTI-CHANNEL VOLTAGE INDICATOR
Filed May 23, 1957 7 Sheets-Sheet 7
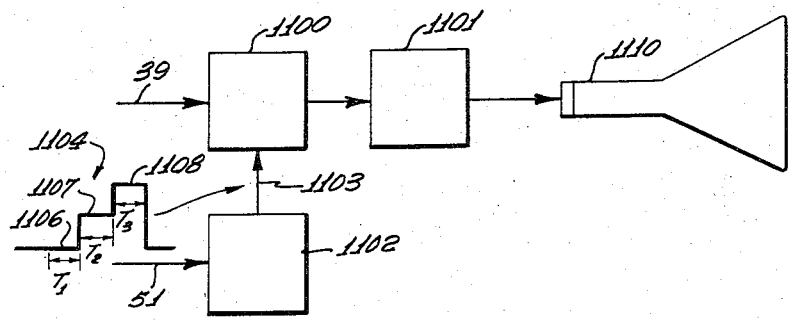
Fig. 11.
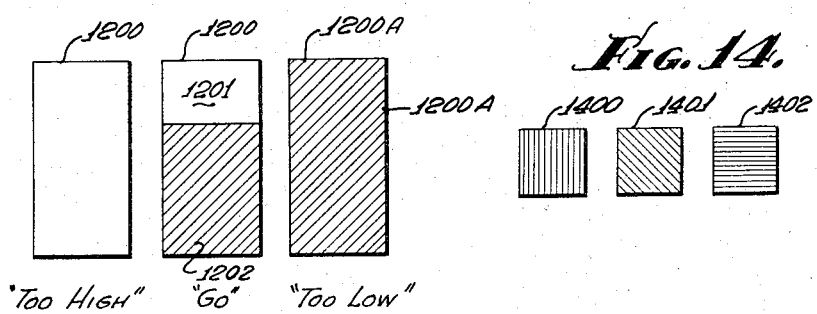
Fig. 12.
Fig. 14.
"Too High"  "Go"  "Too Low"
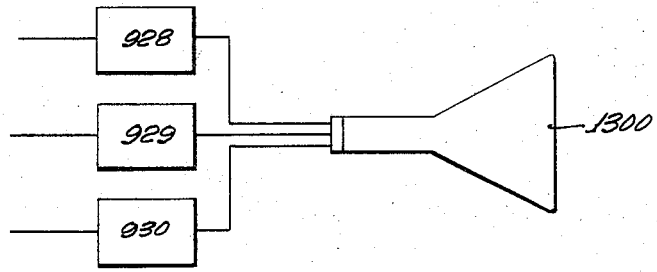
Fig. 13.
INVENTOR.
JEAN C. RABIER
BY his
Nicholas T. Vohr
ATTORNEY.

United States Patent Office 2,878,450
Patented Mar. 17, 1959

2,878,450

HIGH SPEED MULTI-CHANNEL VOLTAGE INDICATOR

Jean C. Rabier, Hawthorne, Calif., assignor, by mesne assignments, to Marquardt Aircraft Co., Van Nuys, Calif., a corporation of California Application May 23, 1957, Serial No. 661,155

14 Claims. (Cl. 324—121)

This invention relates to a high speed multi-channel voltage indicator with "Go," "Too High" and "Too Low" indications, and more particularly to that type of indicator which is capable of reproducing the results of the voltage comparisons on the screen of a cathode ray tube in the form of a display having the above type of indications.

The disclosed tester is suitable for testing complex electronic, electrical, electro-mechanical or mechanical apparatus and to display the results of several hundred voltage measurements in a small part of a second as the usual visual "Go," "Too High" and "Too Low" indications. The tester of this type is also suitable for continuously indicating any defects in equipment where reliability and continuity of satisfactory performance is of great importance. It is also suitable for conducting tests along a high speed production line and for monitoring the equipment during its actual use, such as monitoring radio or television broadcast transmitters where it is important to detect any potential failure of equipment before its actual happening. It is also suitable for testing guided missiles, telemetering devices, electronic computers and any electronic complex equipment which requires testing of many circuits for ascertaining its proper functioning. The disclosed tester is also suitable for testing mechanical equipment in which case transducers transform some measurable mechanical position or location into electronic signals.

The indicator, or tester, includes a voltage comparator, or evaluator, for each individual test position, or for each circuit under test. The circuit under test produces a voltage, which is converted into direct current voltage if it is an alternating voltage, and the direct current voltage is then impressed on the tester where its amplitude is compared with a direct current reference voltage. Since it is necessary to use a common reference voltage for testing a large number of circuits, it becomes necessary to use appropriate voltage adjusting resistive networks which adjust the magnitudes of the voltages under test so as to be within the range of the common reference voltage. Accordingly, each circuit produces a voltage signal which may be within the desired limits ("Go" signal), or too high or too low as compared to the reference voltage. Since the indicator is capable of testing a large number of circuits, a high speed commutator is used for connecting one circuit at a time to a common receiver. The commutator performs two functions: it connects the circuits being tested in a predetermined, known sequence to the receiver and it also modifies a direct current signal normally produced by the circuit under test into pulses. By using pulses, it becomes possible to use alternating current circuits in the receiver rather than direct current circuits which have poor stability.

The magnitude of the individual voltages produced by the individual circuits under test are presented on the screen of a cathode ray tube in the form of bright zones which may be in line with a reference line or above or below the reference line. For example, when the voltage produced by some specific circuit is too high, the bright zone produced on the screen is above the normal central position; when the voltage is within the specified tolerance limits the bright zone will be in the center and in line with the centrally positioned reference line, and when the voltage is too low then it will be below the reference line. The receiver is also provided with appropriate synchronizing, scanning, and signal-evaluation circuits which combine to produce the previously mentioned "Go," "Too High," and "Too Low" indications on the oscilloscope screen. The disclosed tester is capable of utilizing either a black-and-white cathode ray tube or a color tube, in which case red, green, and blue colors are used for representing the three signals, i. e. go, high and low.

It is, therefore, an object of this invention to provide a high speed multi-channel voltage indicator capable of producing go, high and low indications on the screen of a cathode ray tube for a large number of circuits under test.

It is an additional object of this invention to provide a high speed cathode ray tube indicator capable of indicating the state of the circuits, and their proper or improper operation, by comparing the voltages produced by the circuits under test with a common reference voltage and transmitting the results of such comparisons to a receiver which reproduces the results of the comparisons on the screen of an oscilloscope tube.

Still another object of this invention is to provide a tester having a transmitter and a receiver, the latter having evaluation, synchronizing and sweep circuits for reproducing the test signals from a plurality of circuits-under-test as "Go," "Too High," and "Too Low" indications on the screen of a cathode ray tube.

The novel features which are believed to be characteristic of the invention, both to its organization and method of operation, together with the further object and advantages thereof, will be better understood from the following description taken in connection with the accompanying drawings in which the single embodiment of the invention is illustrated here as an example of the invention. It is to be expressly understood, however, that the drawings are for the purpose of illustration and description only and are not intended as a definition of the elements of the invention.

Referring to the drawings:

Figure 1 is a block diagram of the indicator;

Figure 3 is an enlarged view of the representations produced on the face of the cathode ray tube.

Figure 5 illustrates oscillograms of the synchronizing signals and of the test channel signals.

Figures 6 and 7 are oscillograms of the sweep waves generated by the sweep circuits.

Figure 8 illustrates the path produced by the cathode ray beam on the screen of the oscilloscope tube.

Figure 9 is a block diagram of the evaluation circuit.

Figure 10 illustrates the oscillograms of the signals produced in the evaluation circuit of Figure 9.

Figure 11 is a block diagram of the simplified indicator utilizing black and white presentations on the cathode ray tube.

Figure 12 is an enlarged view of the type of signal produced on the screen of the cathode ray tube with the indicator illustrated in Figure 11.

Figure 13 is a block diagram for an indicator utilizing the cathode ray tube having a screen with red, green and blue phosphors.

Figure 14 illustrates the presentations produced on the screen of a color television tube.

Figure 1A:
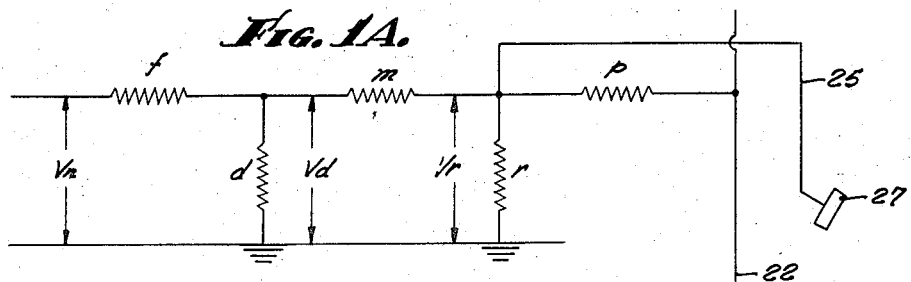
Figure 1A is the schematic diagram of the resistance network used for adjusting the voltages under test.

Referring to Fig. 1, the transmitter 8 includes a plurality of test positions such as 10 and 11, connected to a distributor switch 30 and a common outgoing conductor 39 connected to a receiver 9. Only two test circuits 10 and 11 are illustrated in Fig. 1. In actual practice, however, the number of circuits which can be tested at the same time with the disclosed system is limited only by the area of the screen 200 of the cathode ray tube 45, which is used for indicating the results of the test. For instance, if a regular cathode ray tube having a 17 or 21 inch screen is used, it is possible to test, with good resolution, approximately 200 channels, or circuits, at the same time. The voltages produced by the circuits 10 and 11 are indicated in Fig. 1 as $X_1$ and $X_2$. These voltages are impressed on the respective resistance networks including resistances 12 through 21. These networks are connected to a common reference voltage bus 22 over conductors 25 and 26. The reference voltage bus 22 is connected to a source of reference voltage 23 which may be a battery or a regulated source of direct current voltage. Since all of the test circuits such as 10 and 11, etc. are all connected to the common source of reference voltage 23, it becomes necessary to adjust the magnitudes of the voltages produced by the test circuits so as to be within the range of the magnitude of the voltages produced by the reference source 23. This is obtained by the voltage dividing circuit indicated by resistors 12 and 13 for circuit 10 and resistors 17 and 18 for circuit 11. The voltage divider constant $k$ may be derived from the following relationship.

$$k = \frac{2R}{2E_n + P_n + N_n} \quad (1)$$

where:

$E_n$ is the exact value of the voltage assigned to the voltage under test number $n$. Voltages under test are voltages $X_1, X_2 \ldots X_n$; they may or may not be equal to $E_n$.
$P_n$ is the positive error limit.
$N_n$ is the negative error limit.
$R$ is the magnitude of the reference voltage 23.
$k$ is the divider constant, such as divider 12—13 or 17—18. This divider constant is different for each test position as long as there is a difference in the magnitude of the voltages $X_1, X_2 \ldots X_n$ and is equal to $$k = \frac{d}{f+d} \quad (2)$$

where $d$ and $f$ are the magnitudes, in ohms, of the resistors $d$ and $f$ used for the voltage divider. These resistors are shown in Figs. 1 and 1A.

Also, $$V_d = V_n k \quad (3)$$

where:

$V_d$ is the voltage across resistor $d$, Fig. 1A;
$V_n$ the voltage under test; this voltage may have any value as compared to $E_n$, which is the desired value for $V_n$. When this is the case, then $E_n = V_n$.

The voltage $V_r$, across resistor $r$, is $$V_r = \frac{(V_d) \cdot p - Rm}{p + m + \frac{pm}{r}} \quad (4)$$

where R is the reference voltage, as indicated in Fig. 1A.

If $m = p$, then Equation 4 becomes $$V_r = \frac{V_d - R}{2 + \frac{m}{r}} \quad (5)$$

by making $$K_1 = \frac{1}{2 + \frac{m}{r}} \quad (6)$$

and substituting (6) into (5), one obtains $$V_r = K_1(V_d - R) \quad (7)$$

Substituting $V_d = V_n k$, which is Equation 3, into 7, one obtains $$V_r = K_1(V_n k - R) \quad (8)$$

The constants $k$ and $K_1$ must be given values so as to satisfy the following relationship $$V_r = +a \quad (9)$$

if $V_n$ is equal to $$V_n = E_n + P_n \quad (10)$$

and $$V_r = -a \quad (11)$$

if $V_n$ is equal to $$V_n = E_n - N_n \quad (12)$$

where:

$+a$ is the magnitude of the positive, acceptable voltage limit as it appears in the output of transmitter 8, Fig. 1, i. e., it is the maximum acceptable value of $V_r$.
$-a$ is the magnitude of the negative acceptable voltage limit as it appears in the output of transmitter 8, Fig. 1, i. e., it is the minimum acceptable value of $V_r$.

In the disclosed voltage transformation system, including all resistors shown in Fig. 1A, the transformation must be accomplished so that $V_r$ must be the same for all the test channels, irrespective of the magnitude of $E_n$ and irrespective of the magnitudes of $P_n$ and $N_n$.

Figure 1B:
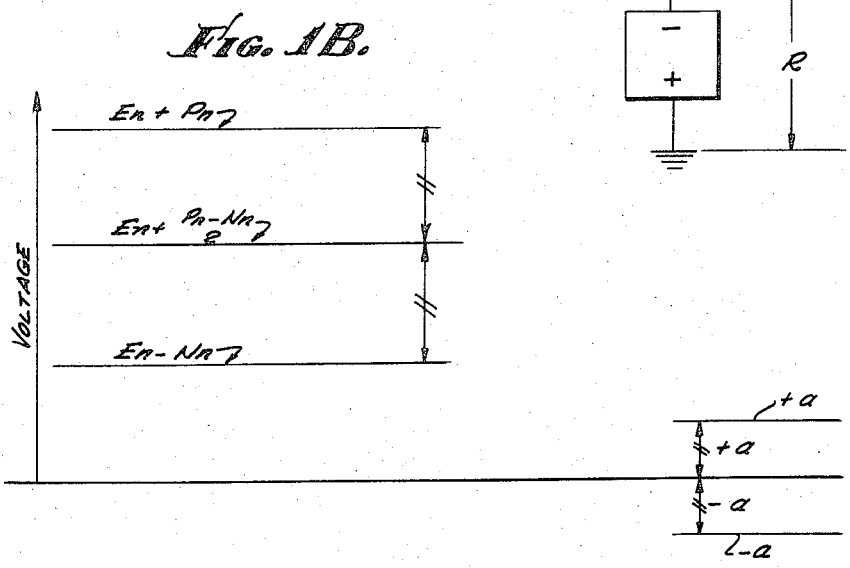
Figure 1B is an explanatory figure illustrating the voltage levels.

The above is illustrated in graphic form in Fig. 1B.

All of the circuits under test are connected to segments 27, 28, etc. of a distributor switch 30, having a rotatable arm 31. Arm 31 is mounted on a shaft 32 of a synchronous motor 33, which is connected to a source of alternating current 34. Two segments 35 and 36 of switch 30 are connected to two sources of direct current potential, 37 and 38, which are used for providing positive and negative synchronizing signals, or pulses. Arm 31 is connected to a conductor 39, which is connected to an output impedance 40, a voltage evaluating circuit 42 and synchronizing signals discriminator 43. The output of the evaluator circuit 42 is connected over a conductor 46 to an intensity control grid 44 of a cathode ray tube 45. The output of discriminator 43 is connected to the vertical and horizontal scanning signal generators 47 and 48, which are connected to the vertical and horizontal scanning yokes 49 and 50 of the cathode ray tube 45. Discriminator 43 is also connected over conductor 51 to the evaluator circuit 42.

Figure 4:
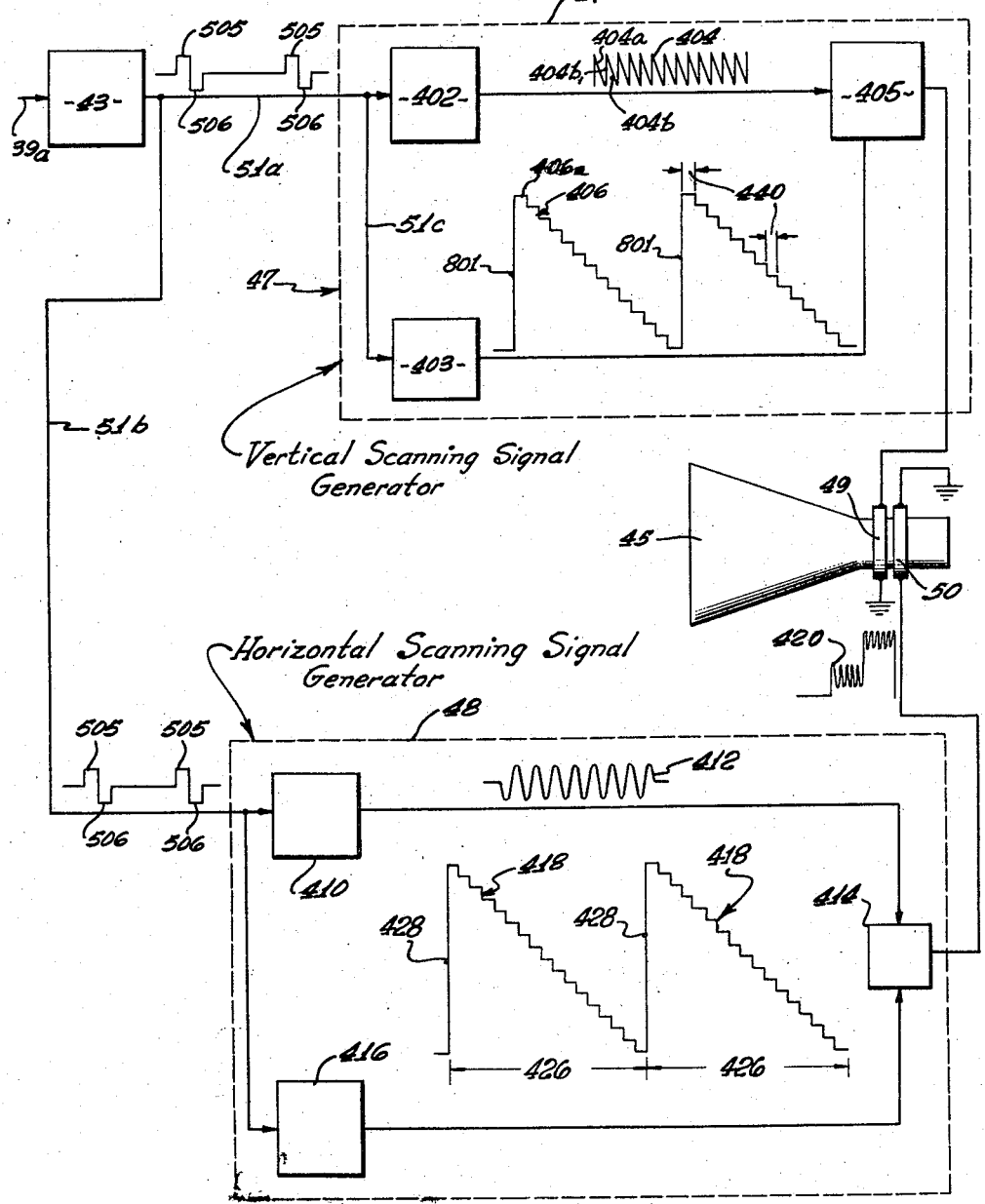
Figure 4 is a block diagram of the sweep circuit channels.

A more detailed block diagram of the scanning signal generators is illustrated in Fig. 4. The synchronizing signals discriminator 43 receives synchronizing signals from the positive sources of potential 37 and 38. The oscillograms of several types of the synchronizing signals which may be used in connection with the disclosed tester are llustrated in Fig. 5. In Fig. 5A the synchronizing signal is illustrated as a positive rectangular pulse 500, which has a higher amplitude than the signals 501, 502, 503 which represent the signals produced by the test channels number 1, 2, and 3. In Fig. 5B, the synchronizing signal is represented by a rectangular wave 504, having a positive amplitude which is equal to the positive portion of the test signals 501 through 503, but being of longer duration than the test signals. In Fig. 5C, the synchronizing signal includes a positive pulse 505 and a negative pulse 506 having substantially the same amplitudes as the positive and negative amplitudes of the test signals 501 through 503 produced by the circuits under test. This type of synchronizing signal corresponds to the signals generated by the direct current source 37 and 38 illustrated in Fig. 1.

In Fig. 5D the synchronizing signal is represented by an alternating current wave 507 which may represent a separate signal produced by a source of alternating potential connected to a commutator 35 or 36 of switch 30. The source of alternating potential producing signal 507 may be connected to one of the test circuit segments such as segment 27 or 28, in which case it modulates the direct current signal produced by the test voltage in the manner illustrated at 508 in Fig. 5D. In Figures 5A through 5D all synchronizing signals, irrespective of their shape, are impressed on a common output conductor 39, which represents a common output conductor transmitting all test signals as well as the synchronizing signals from transmitter 8 to receiver 9. Whenever synchronizing signals and the test signals are impressed on the common conductor, such as conductor 39, it becomes necessary to have a synchronizing signals discriminator, such as discriminator 43, which is capable of rejecting all test signals and passing through it only the synchronizing signals. The transmitted synchronizing signals then are used on the output side of the discriminator 43 for synchronizing the vertical and the horizontal scanning signal generators 47 and 48 in the manner which will be described more fully in connection with the description of Figures 4, 6, 7, and 8. The synchronizing signals may also have an independent channel in which case the synchronizing signals, impressed on the segments 35 and 36 are transmitted, over a separate conductor and a separate distributor switch, directly to the scanning signal generators 47 and 48. Such a synchronizing system will require an additional distributor switch and an additional distributor arm, such as arm 31, mounted on shaft 32 and rotated by the same motor 33. The synchronzing system of the latter type is illustrated in Figure 5E where the synchronizing signal 510 is illustrated as a separate signal, appearing on a separate channel from the channel transmitting the test signals 501 through 503.

The synchronizing systems of the types illustrated in Figs. 1 and 5 are well known in the television and communications art and therefore, need no detailed additional description. The same is also true of the synchronizing signal generators 47 and 48.

Referring once more to Figure 4, the synchronizing signals 505 and 506, Fig. 5C, are transmitted by discriminator 43 while the test signals are rejected. The synchronizing signals are then impressed over conductor 51a on the vertical scanning signal generator 47 and on the horizontal scanning signal generator 48 over conductor 51b. The vertical scanner 47 includes a saw tooth generator 402 and a step-wave generator 403. The saw tooth generator 402 generates a continuous saw tooth wave 404, which is impressed on an adder circuit 405. The step wave generator 403 generates a step-wave 406 which has as many vertical steps as required by the number of horizontal circuit positions 201–216 represented on the oscilloscope screen shown in Fig. 2. In the example illustrated in Figs. 2, 4, and 8, the step-wave 406 has thirteen steps which means that there will be thirteen individual vertical circuit positions, 1 through 13, illustrated in Fig. 2. The circuits of the saw-tooth wave generator and the step-wave generator are known in the art and require no specific description. The vertical step wave 406 produces the vertical scans, or shifts, or steps 802, 804, etc., for each vertical step. For example, the first step 406a produces a shift of the cathode ray beam from position 802 to position 804. The individual vertical sweep 802, within position 802—803, is produced by a single saw-tooth wave 404a. Vertical shift 807 is produced by the vertical portion 404b of the second saw-tooth wave 404b, etc. The saw tooth wave 404 and the step wave 406 are combined in the adder circuit 405 to produce the resultant wave 407 illustrated in Fig. 6. This composite wave is impressed on the vertical deflection coil 49 where it produces all the vertical scans illustrated in Fig. 8. Since there are sixteen individual circuit presentations (1 through 16 in Fig. 2) along each horzontal position (1 through 13 in Fig. 2), there are sixteen saw-tooth waves 404 on the top of each rectangular wave 430.

Figure 2:
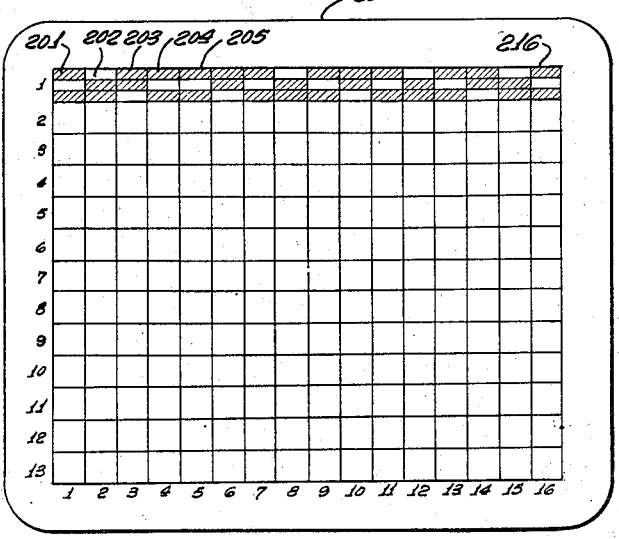
Figure 2 is a view of the face of cathode ray tube.

The synchronizing signals are also impressed on the horizontal scanning signal generator 48 (Fig. 1) which includes a multi-vibrator or oscillator 410 (Fig. 4), which generates either a saw tooth wave or a sinusoidal wave 412, which is impressed on an adder circuit 414. The synchronizing signals are also impressed on the step wave generator 416 which generates a step wave 418. In the illustrated example, this wave has 16 steps as illustrated in Figures 4 and 2. It is combined with wave 412 in adder 414 to produce a horizontal sweep composite wave 420 shown in Figs. 4 and 7. This wave is impressed on the horizontal sweep coil 50.

The path travelled by the cathode ray beam is illustrated in Fig. 8. It is the path which is produced in response to the combined two magnetic fields produced by the vertical deflection wave 407 and the horizontal deflection wave 420. The return path 800 of the electron beam is produced by the combined effect of the vertical portions 801 of wave 407, Fig. 6, and the horizontal sweep portions 428 of wave 420. Accordingly, the saw tooth waves 404 produce the vertical deflection 802 and the horizontal deflection wave 412 produces the horizontal deflections 803. The vertical scan saw tooth wave 404 therefore produces one vertical scan 802 for each individual test circuit. This vertical scan 802 has a single vertical scan and a plurality of horizontal scans within it, as illustrated in Fig. 8, for complete scanning of the individual sub-frame 802—803, which represents one circuit under test on screen 200 of the oscilloscope screen 45. The number of the horizontal scans and the spacing between the horizontal lines within the sub-frame is determined by the resolving power of the screen and also the desired image resolution to be produced for each circuit and its sub-frame, and the actual physical area allotted on the oscilloscope screen for indicating the condition of the test circuit. This area corresponds to area 802—803 in Fig. 8. From the above, it follows that the presentation of the individual circuits on the oscilloscope screen follows the same techniques and basic principles which are used in conventional television, except that it now becomes necessary to consider the resolving power of a single sub-frame rather than the resolving power of the entire frame, the entire frame, in the present usage of this word, corresponding to the usage and the meaning attributed to the "frame" in the television art. In the example illustrated in Fig. 2, one complete frame is composed of 16×13=208 sub-frames. The horizontal waves 412, spanned by an arrow 422 in Fig. 7, produce a plurality of horizontal scans 803 during the interval of time required for producing a single saw tooth wave 404a or 404b, Fig. 4. The return path 807 is produced by the vertical portion 425, Fig. 6, of the saw tooth wave 404 and a corresponding portion of the horizontal wave 412. There are sixteen individual saw tooth waves 404a, 404b, etc. generated during the period of time indicated by an arrow 440 in Fig. 6 and during this period of time the beam travels from the left upper corner of the screen to the right upper corner of the screen and point 806 indicated in Fig. 8. The beam is then returned to point 812 by the vertical portion 428 of the horizontal sweep wave 420. This process is repeated thirteen times since the composite vertical wave 407 has thirteen vertical steps 430.

The description of the sweep circuits and of the composite waves of 420 and 407 indicates that thirteen horizontal positions and sixteen individual circuit presentations are produced during a period of time 440 indicated in Figs. 4 and 7. During this period of time, the entire horizontal wave 418 and a very large number of waves 412 is generated by the horizontal sweep signal generator, as indicated by the period 426 in Figs. 7 and 4. The horizontal sweep cycle 426 is drawn on a much larger horizontal scale than cycle 440 for a clearer illustration of the horizontal sweep waves 412 and 420. With the horizontal and vertical waves of the above type, the cathode ray tube will reproduce 208 individual images of the test signals received from 208 individual circuits under test, such as circuits 10 and 11 in Fig. 1.

The cathode ray beam is intensity-modulated to produce visible indication on oscilloscope screen 200 in a form of illuminated rectangles 304, 305 or 306 in conformance with the amplitude of the resultant test signal produced on conductor 39 by the individual circuits under test. Signal 300, or the centrally illuminated portion 305, is produced when the circuit under test produces a voltage signal within the designated limits for that particular voltage. Signals 301 and 302 indicate the "Too High" and "Too Low" indications when the test signal has either a too high value or a too low value as compared to the designated tolerance limits. One "line" of such signals is also illustrated in Fig. 2 at 201 through 216 as they appear on the oscilloscope screen. Only one horizontal series of images is illustrated in Fig. 2. If the vertical and horizontal waves are of the type described previously, screen 200 will reproduce 208 individual indications in the manner described previously.

The above type of signals are produced with the aid of the evaluator circuit 42 which impresses a positive signal on the intensity grid 44 of the cathode ray tube 45 in proper time, or phase, relationship with respect to the scanning waves 407 and 420. The illuminated portions 304–306 indicate that the screen grid 44 must receive a positive signal during the initial, or upper third, of travel of the cathode ray beam along the path 802, Fig. 8, for producing a "Too High" indication; the intensity grid signal must be impressed on grid 44 during the middle portion of travel 802 to produce a "Go" indication, and during the latter one-third of path 802 to produce the "Too Low" indication.

The block diagram of the evaluator circuit is illustrated in more detailed manner in Fig. 9. All test signals are impressed, over conductor 39, on the two adders 900 and 901. These adders also receive negative and positive pulses, respectively, over conductors 902, 903 from the positive pulse generator 904 and the negative pulse generator 905, respectively. Fig. 10 illustrates the oscillograms of the signals produced in the evaluator circuits of Fig. 9. The voltage test signals 1000, 1001 and 1002, which are produced by the individual circuits under test, such as circuits 10, 11, etc., are impressed on the adders 900 and 901 over conductor 39. The positive pulses produced by generator 905 are pulses 1003 through 1005 while the negative pulses produced by generator 904 are pulses 1006 through 1008. These positive and negative pulses may be generated by such known circuits as multi-vibrators, the operation of which is timed, or synchronized, by the synchronizing pulses 1034, 1036, etc., impressed upon them through conductor 51. The amplitudes of the waves 1003–1005 and 1006 to 1008 are adjusted so as to be equal to $+a$ and $-a$, where $+a$ and $-a$ are the voltage amplitudes defined by the Equations 9 and 11. These amplitudes are equal to the maximum positive and negative voltage error limits which define the range of departure of the voltage under test from the exact desired value. With the amplitudes of the rectangular waves 1003 adjusted in the above manner, when such positive rectangular wave is impressed on adder 901 in identical phase relationship with test signals 1000, 1001 and 1002, the adder will produce positive rectangular waves 1010, 1011 and 1012 in its output. The amplitude of the waves 1010–1012 is the direct function of the amplitudes of the waves 1000–1002 and 1003–1005. This amplitude may be positive or negative, depending on the sign and amplitude of the test signals 1000–1002 and the algebraic summation of these signals with the reference waves 1003–1005. Pulses 1010–1012 are impressed over a conductor 906 on the diode circuits 907 and 908.

The signals produced by the synchronizing signal discriminator 43 and the delay circuits 918 and 919 are illustrated in Fig. 10 at $k$, $l$, $m$, and $n$ in proper phase relationship with respect to the remaining signals appearing in the evaluator circuit. Signal $k$ is the synchronizing signal appearing in the output of discriminator 43 which impresses this signal on conductor 51 and, through this conductor, this signal is impressed on the negative pulse generator 904, positive pulse generator 905, the multi-vibrator pulse generator 920 and the vertical and horizontal scanning signal generators 47 and 48. Multi-vibrator 920 produces a rectangular pulse $l$, or 1032, and the multivibrators 918 and 919 produce rectangular pulses $m$ and $n$ or 1037 and 1038, in the phase relationship illustrated in Figs. 10 and 9. Pulse $l$ is impressed over conductor 926 on a gate circuit 929, and pulse $n$ is impressed on a gate circuit 930. The gate, or coincidence, circuits are well known in the art and need no description; for example, they may represent a normally non-conductive multi-grid tube which is made conductive when two positive signals are impressed on two grids of the tube. Pulses $l$, $m$, and $n$ are one set of positive pulses and the second set of positive pulses is produced by the discriminator, or diode, circuits 932, 933, 907, 908 and the coincidence circuit 934, the latter being connected to the diodes 933 and 907 over conductors 936 and 911. The input sides of the diodes 932 and 933 are connected to the output of adder 900 over a conductor 938. Diode 932 is connected to gate 928 over conductor 938, diode 908 is connected to gate 930 over conductor 914 and coincidence circuit 934 is connected to gate 929 over conductor 940. The outputs of the gate circuits 928, 929 and 930 are connected in parallel to the common conductor 46 which is connected to the intensity grid 44 of the cathode ray tube 45, as indicated in Fig. 1.

The operation of the evaluation circuit is as follows. The adders 900 and 901 receive the voltage evaluation signals which are variable amplitude direct current pulses illustrated at $a$ in Fig. 10. They may be positive, negative or zero amplitude signals when the voltage under test produces a voltage signal which is higher or lower than, or is equal to, the reference voltage 23, Fig. 1. The positive signal is signal 1000 in Fig. 10a, and the negative signals or signals 1001 and 1002. These voltage signals, or test signals are combined with a positive rectangular wave 1003 in adder 901 and with a negative rectangular wave 1006 in adder 900. The resulting output of adder 901 is illustrated at $d$ in Fig. 10, and of adder 900 at $e$. These signals are impressed on the diodes 907—908 and 933—934 respectively. Diode 907 transmits only the positive waves 1010 and 1011 to the coincidence circuit 934 over conductor 911 as two positive waves 1018 and 1019 shown at $f$ in Fig. 10. The negative wave 1012 is blocked by diode 907 but is transmitted by diode 908 as wave 1020 to gate 930. This negative wave is illustrated at $i$ in Fig. 10. The same type of action takes place at the diodes 932 and 933 when the negative waves 1006, 1007 and 1008 ($c$) and the test signals 1001, 1002 and 1003 ($a$) are impressed on adder 900 and the resulting output signals 1014, 1015 and 1016 ($e$) are impressed on the diodes 932 and 933. Diode 932 impresses signal 1022 ($j$) on gate 928 and diode 933 transmits waves 1023 and 1024 ($g$) to the coincidence circuit 934.

The gates 928, 929 and 930 and the coincidence circuit 934 operate as follows: when they receive the above signals, gate 928 transmits a signal 1026 ($o$) when the signals 1022 ($j$) and 1032 ($l$) are impressed simultaneously on gate 928. It should be noted that the width of the positive gating pulse 1032 is one third as wide as pulse 1022. With pulse 1032 being one-third as wide as pulse 1022, it is made equal to one-third of the duration of the vertical sweep or "frame" 802, Fig. 8, and, therefore, the three dimensions 308, 309 and 310, Fig. 3 are made equal to each other. The lengths of the synchronizing pulses 1037 and 1038 are equal to pulse 1032. The width of pulse 1037 and of pulse 1038 is equal to the width of pulse 1032 since pulses 1037 and 1038 represent no more than the delayed pulse 1032. The pulse repetition rate of the synchronizing pulses 1034–1036 is equal to the time interval required for brush 31 to traverse one segment 36, or 27, and one segment 55; or, the travel time of brush 30 across one channel position on distributor 30. The synchronizing pulses 1034–1036, etc. do not appear in Fig. 9 because they are generated within the pulse generator 920 by a synchronized frequency multiplier and then are used for timing the generation of the rectangular wave 1032 appearing in the output of generator 920. These rectangular pulses 1032 are also used for producing the delayed pulses 1037 and 1038, as stated previously.

The signals appearing in the outputs of the gates 928, 930 and 931 are all impressed on conductor 46 as positive signals 1026, 1028 and 1030. These signals should have a reasonably constant output and the same polarity since they are impressed on the intensity grid of the picture tube and must produce uniform brightness irrespective of whether the signal is "Go," "No go too high" or "No go too low." Since the positive pulse 1026 coincides with the upper third of the scanning period 803—802, Fig. 8, for each test position, only the upper portion of the test position, illustrated at 301, Fig. 3, will be illuminated on the oscilloscope screen 200, thus producing a visual indication that the voltage produced by the test circuit is too high, or higher than the allowed upper tolerance. Diode 932 blocks all negative signals and therefore the negative signals have no effect on gate 928 and gate 928 remains non-conductive as long as the test pulse 1000 has a negative polarity rather than the positive polarity shown in Fig. 10 at 1000 (a). The negative signals 1015 and 1016, however, are transmitted by diode 933 and are impressed on the coincidence circuit 934 as the negative pulses 1023 and 1024 (g). The coincidence circuit 934 responds only when a positive pulse, such as pulse 1023 (g), is impressed simultaneously on the coincidence circuit. This circuit may consist, for example, of a triode, or pentode, with the conductor 911 connected to the control grid of the pentode and conductor 936 connected to its cathode. The pentode is biased so that it is normally non-conductive and it is rendered conductive only when a positive signal 1019 (f) is impressed on its grid and a negative signal 1023 (g) is impressed on its cathode. Conductor 940 may be connected to the cathode of the pentode on one side and to the control grid of a pentode in the gate circuit 929 so that when the coincidence circuit pentode 934 is rendered conductive, it impresses a positive signal 1040 in the control grid of the second pentode of the gate circuit 929. Gate 929 is rendered conductive only when it receives a positive pulse 1040 and a positive gate-pulse 1037a which is timed so as to produce pulse 1028 in the output of gate 929 when the cathode ray beam is scanning the mid-portion of a subframe 810—811 or any similar sub-frame. Therefore, signal 1028, if and when it is produced, produces a "Go" signal on the oscilloscope screen.

In the light of the above description, it follows that positive test signals, such as 1000 (at "a," Fig. 10), produce a positive signal 1018 (f) impressed on the coincidence circuit 934. Signal 1018 (f), however, produces no output in gate 929 as long as its amplitude is "too high," or is so high that it removes, or neutralizes the effect of the negative wave 1006 in adder 900 or produces a positive pulse 1014 in the output of adder 900. This positive pulse 1014 cannot pass through diode 933 and, therefore, as long as the amplitude of the test signal is "too high," no negative signal appears on conductor 936 (see position "g" in Fig. 10: there is no negative signal at 1050) and gate 934 remains non-conductive even though a positive signal 1018 is impressed on gate 934 by diode 907.

The amplitudes of the waves 1003–1005 and 1006–1008 are adjusted so as to produce proper "Too High," "Go" and "Too Low" indications in response to the various amplitudes and polarities of the test signals 1000–1002. The "Go" signal, therefore, is produced only when signal 1001 has a low amplitude, either positive or negative, or zero amplitude which amplitude is lower than the amplitudes of the rectangular waves 1003–1005 and 1006–1008, so as to produce the positive and negative waves 1019 and 1023. When wave 1001 has an amplitude which is equal to the amplitude of wave 1003 or 1006, then either wave 1019 or 1023 is not present and the output of the coincidence circuit is equal to zero, as indicated by lines 1042 and 1043 at (h) in Fig. 10, and the "Go" indication is absent while either "Too High" or "Too Low" indication is present.

The operation of the "Too Low" portion of the evaluator circuit, including diode 908 and gate 930 is identical to that of the "Too High" portion, including diode 932 and gate 928. The negative wave 1020, Fig. 10–i is combined with positive pulse 1038b to produce an output signal 1030 which coincides with the bottom, or the lower third, of the sweep sequence, such as 803—802 in Fig. 8. This, in turn, produces signal 302 on screen 200.

In the light of the above description, it follows that either one of the three readings, "Too High," "Too Low" or "Go" is produced on the oscilloscope screen 200 of receiver 9 in response to the test signals produced by transmitter 8, the "Go" signal indicating that the test signal is within the limits determined by the individual settings of the input resistive networks such as networks 12–16 and 17–21. The number of the circuits that may be tested simultaneously is determined by the size of the oscilloscope screen 200.

The cathode ray tube 45 may be a conventional tube, such as that used in television receivers, or it may be a memory tube which retains the image for a considerable length of time after its phosphor has been bombarded by the electrons. Such tubes are especially suitable if photographing of the entire presentation on the screen is contemplated.

The tester described in connection with Figs. 1–10 may be simplified if the type of presentation illustrated in Fig. 3 is replaced with that illustrated in Fig. 12. In Fig. 12, the "Too High" presentation consists of an illuminated rectangle 1200, the "Too Low" presentation consists of a dark rectangle 1200A, and in the "Go" presentation only the upper portion 1201 is illuminated, while the lower portion 1202 remains dark. The block diagram for the circuit producing the type of presentation shown in Fig. 12 is shown in Fig. 11. The test signals 1000–1002 are impressed directly on an adder 1100 over conductor 39 which corresponds to conductor 39 in Fig. 1. The synchronizing signals 1034–1036 are impressed over conductor 51 on a step wave generator 1102 which produces a stepped wave 1104 having three time intervals $T_1$, $T_2$ and $T_3$ and three amplitude levels 1106, 1107 and 1108. If the transformed test signal has an amplitude which is lower than the minimum tolerance, adding of this test signal to the stepped wave 1104 should not overcome the cut-off bias of tube 1110 and the entire square area 1200A remains dark. The "Go" signal may illuminate either only the upper one-third or the upper two-thirds of block 1200, depending on the amplitude of the transformed test signal. When the amplitude of the transformed test signal has a maximum amplitude but within the upper limit, the upper two-thirds of block 1200 will be illuminated. When the amplitude of the transformed test signal has a minimum amplitude but within the lower limit, only the upper one-third of block 1200 will be illuminated. When the transformed signal is too low, the entire screen will be dark.

The system shown in Figs. 1 and 9 may also be used with a color picture tube 1300, Fig. 13, by connecting the outputs of the three gate circuits 928, 929, and 930 to the respective intensity grids of the three electron guns mounted within tube 1300. Fig. 14 illustrates the three color signals produced on the screen of tube 1300 with red color square 1400 indicating "Too High," green color square 1401 indicating "Go," and blue color square 1402 indicating "Too Low." The advantage of the color system resides in the fact that a larger number of signals can be reproduced on a screen of given size since the presentations 1400, 1401 and 1402 are all reproduced on the same area of the screen. Accordingly, at least three times as many test channels can be connected to the color tube as compared to the black-and-white tube. The sweep circuits for the color system are identical to that for the black-and-white system.

The disclosed comparator uses direct current reference voltage, which means that the test voltage also must be direct current voltage. It is much simpler to use direct voltages on the transmitter side of the comparator because stable direct reference voltages are readily available and because it is simpler to compare two direct voltages rather than two alternating voltages. In the latter case, it would be necessary to compare the amplitude in the same manner as in the case of the direct voltages, but it also would be necessary to have the alternating reference voltage and the test voltage in strict phase-opposition or co-phase relationships, i. e., 180° out of phase in one system and 0° out of phase in the second system. The latter requirement, for all practical purposes, eliminates the use of alternating current througout the comparator. When alternating voltages are encountered in the test circuits, it is much simpler first to rectify them and then use these direct voltages for comparison with the direct reference voltage. The disadvantage of having direct voltage circuits, however, is eliminated immediately upon obtaining the comparison voltage, or error voltage, by converting this direct error voltage into a pulse at commutator 30, which, for all practical purposes, can be treated by receiver 9 as an alternating current signal. Accordingly, the comparator uses first direct current circuits and then alternating current circuits where it is most advantageous to have them.

What is claimed as new is:

1. A high speed voltage indicating, or measuring, system including a plurality of voltage sources to be tested, a corresponding plurality of matrices, a direct current reference voltage connected in parallel to one side of all of said matrices, the other side of each matrix being connected to its respective voltage source, a distributor having a plurality of segments, each segment being connected to its respective matrix for receiving a corresponding voltage test signal, a source of synchronizing signals connected to said distributor, a test signal evaluation circuit and sweep cicuits connected to said distributor for receiving said test and synchronizing signals, respectively; and a cathode-ray tube connected to said test signal evaluation circuit and to said sweep circuits for reproducing on its screen a corresponding plurality of individual visual images, said signal evaluation circuit and said sweep circuits, in combination, controlling said images to indicate a "too high," a "too low" and within the set limits magnitudes of said voltage test signals.

2. A high speed voltage comparator comprising a resistance network; a first unknown source of voltage connected to one side of said network and a second direct current reference voltage source connected to the other end of said network; said first and second sources, in combination, producing a voltage test signal for determining the amplitude of said first source as compared to said reference voltage; a voltage evaluation circuit connectable to said network; said voltage evaluation circuit having means for producing too high, too low or go signal in response to, and depending upon the amplitude of, said test signal; sweep circuits for generating two composite vertical and horizontal scan sweep waves; and a cathode ray tube connected to said evaluation circuit and said sweep circuits, said tube having means for producing three respective visual images in response to the signal produced by said evaluation circuit and said sweep waves, said images indicating whether said signal is within the tolerance limits or is lower or higher than said tolerance limits.

3. The high speed voltage comparator as defined in claim 2, in which said resistance network comprises first and second voltage dividers having first and second taps, respectively; and a resistor interconnecting said taps; said first source being a direct current voltage connected across the first divider and said second source being a direct current voltage connected across the second divider, said first and second sources being connected in series with each other through said network.

4. The high speed voltage comparator as defined in claim 2 which also includes a distributor for periodically connecting said network to said evaluation circuit, and said evaluation circuit including a first source of positive rectangular waves, a second source of negative rectangular waves, both of said waves having equal amplitudes, and means for individually comparing the amplitude of said test signal with the amplitudes of said first and second waves.

5. A high speed voltage comparator comprising a source of direct current reference voltage, a plurality of direct current voltage sources to be compared with said reference voltage, a resistive network for each voltage source, said network being connected on one side to said voltage source and on the other side to said reference voltage for producing a test signal as the result of the comparison of each voltage source with said reference voltage through the respective resistive network, an evaluation circuit and a distributor serially connected to each other and to said networks, said distributor having means for sequentially connecting said evaluation circuit to said networks, said evaluation circuit having means for producing first, or second or third indication signal in time-displaced relationship with respect to each other, with the first signal being produced during the first time-interval when the voltage source is too high, the second signal being produced during the second time-interval when the voltage source is within the tolerance limits, and the third signal being produced during the third time interval when said voltage source is too low, said time intervals following each other, a cathode ray tube having a screen, and an intensity grid, said grid being connected to said evaluation circuit to receive said first, second and third signals and to intensity-modulate the electron beam in said tube, and sweep circuits for said tube, said sweep circuits being timed to reproduce said first, second and third indication signals on adjoining first, second and third areas on said screen.

6. The high speed voltage comparator as defined in claim 5 in which said evaluation circuit includes first, second and third gate circuits; a pulse generator and first and second delay networks generating, respectively, first, second and third gate signals impressed, respectively, on said first, second and third gate circuits in timed relationship, with the first gate signal being impressed first on said first gate circuit, the second gate signal then being impressed on the second gate circuit, and the third gate signal being impressed thereafter on the third gate circuit, said first gate circuit being rendered conductive only when said test signals have an amplitude greater than the desired maximum, said third gate circuit being rendered conductive only when said test signals have an amplitude smaller than the desired minimum, and said second gate circuit being rendered conductive only when said test signals have an amplitude within said maximum and minimum limits.

7. The high speed voltage comparator as defined in claim 5 in which said sweep circuit includes first vertical scan means for producing a vertical scan first rectangularly stepped wave having a plurality of first rectangular steps; said first means also producing a first saw-tooth wave superimposed on said first rectangularly stepped wave; said first saw-tooth wave being timed to produce a vertical scan for each individual circuit sub-frame by means of one first saw-tooth wave, and each of said first rectangular steps of said first rectangularly stepped wave is timed to produce a vertical scan from one upper horizontal row of sub-frames to the next succeeding lower horizontal row of frames for each first rectangular step in said first wave; and second means for producing a horizontal scan second rectangularly stepped wave having a plurality of second rectangular steps and horizontal sub-frame-scanning saw-tooth waves superimposed on said second wave for producing a horizontal scan for each sub-frame by means of said sub-frame-scanning wave and a horizontal shift from sub-frame-to-sub-frame and from the end of each horizontal row of sub-frames to the beginning of the next succeeding row of sub-frames by means of said second rectangulary shaped wave; the full amplitude of said first wave producing a vertical return scan from the last, lower-most horizontal row of sub-frames back to the first, uppermost horizontal row of sub-frames, said last and first rows defining the horizontal boundaries of a complete frame; said frame including a plurality of horizontal and vertical rows of said sub-frames.

8. A high speed voltage comparator having a plurality of direct-current sources of voltage, a direct-current source of reference voltage for comparing the magnitudes of said sources with said reference voltage, a corresponding plurality of comparator circuits connected to their respective sources and to said source of reference voltage, switching means sequentially sampling during respective time intervals T's, said comparator circuits to produce a corresponding plurality of voltage test pulses, the amplitude and polarity of each test pulse being a function of the magnitude of the corresponding source of voltage, a pulse amplitude and polarity evaluation circuit connected to said switching means, said evaluation circuit including first, second, and third gate circuits and control means for said gate circuits, said control means producing first, second and third series of control pulses, said first series of control pulses, in combination with the test pulses, making said first gate circuit operative to produce a first output signal only when the magnitude of said test pulses is greater than a predetermined maximum limit, said test pulses and said third series of control pulses making said third gate circuit operative to produce a third output signal only when the magnitude of said test pulses is smaller than a predetermined minimum limit, and said test pulses and the second series of said control pulses making said second gate circuit operative to produce a second output signal only when the magnitude of said test pulses is within said limits, said control means controlling said gate circuits by means of said series of pulses so as to produce said first, second and third output signals during the respective time intervals $t_1$, $t_2$, and $t_3$, where $t_1+t_2+t_3=T$, and $t_2$ follows $t_1$, which $t_3$ follows $t_2$.

9. A high speed voltage comparator for testing the amplitude of a plurality of independent voltage sources, said comparator including first means for producing a corresponding plurality of test pulses whose respective amplitudes are functions of the instantaneous amplitudes of the respective sources, second means for producing a first pulse only when an individual source under test is above an upper tolerance limit for the amplitude of said individual source, third means for producing a second pulse only when said individual source is within the upper and lower limits for the amplitude of said individual source, fourth means for producing a third pulse only when said individual source is below the lower limit for the amplitude of said individual source, only one of said first, second or third pulses being generated by said respective second, third and fourth means in response to each test pulse, and means for converting said one pulse into a visual image for visually indicating the amplitude of said individual voltage.

10. The high speed voltage comparator as defined in claim 5 in which each of said resistive networks includes first and second parallelly connected voltage dividers, said first voltage divider being adjusted to transform the maximum acceptable positive voltage increment in said test signal to an amplitude increment $+a$ and the minimum acceptable negative voltage increment in said test signal to an amplitude decrement $-a$, the absolute values of said increment $+a$ and decrement $-a$ being equal to each other.

11. The high speed voltage comparator as defined in claim 10 in which said second voltage divider is connected to said first voltage divider on one side and to said reference voltage on the other side, the output of said second voltage divider being connected to said distributor, said second divider being adjusted to make the amplitude of the test signal equal to zero when $+a=0$ and $-a=0$.

12. A high speed voltage comparator comprising a plurality of direct voltage sources under test, a direct current reference voltage, a network for each source, said network being connected to its respective source and to said reference voltage, said network producing a continuous direct current signal having an amplitude directly proportional to the amplitude of its source under test, first means for continuous, repeated and rapid sampling of said signal for producing a series of test pulses representing the instantaneous amplitude of said direct current signal and of the corresponding source, an evaluator circuit connected to said first means; said evaluator circuit having means for producing, in timed sequence, either first, second or third output pulse in response to said test pulse; said first output pulse being produced only when the amplitude of said test pulse is higher than a predetermined maximum limit, said third output pulse being produced only when the amplitude of said test pulse is lower than a predetermined minimum limit, and said second output pulse being produced only when the amplitude of said test pulse is within said limits, a cathode ray tube having horizontal and vertical sweep control means and an intensity grid; said grid being connected to the output of said evaluator circuit for modulating the cathode ray of said tube by means of said output pulses, a source of synchronizing signals connected to said first means, said first means impressing said synchronizing signals on said evaluator circuit, vertical and horizontal sweep circuits also connected on the input sides to said first means for receiving said synchronizing signals and generating on the output sides vertical and horizontal sweep waves in synchronism with said synchronizing signals and said output pulses, the output sides of said sweep circuits being connected to said sweep control means, said sweep waves and said output pulses controlling said cathode ray tube to produce "too high" or "go" or "too low" visual indication on the screen of said tube in accordance with the amplitude of said output pulses.

13. The high speed comparator as defined in claim 12 in which said vertical sweep circuit includes a vertical saw-tooth wave generator, a vertical scan stepped rectangular wave generator and an adder circuit connected to said generators, said adder circuit combining said vertical saw-tooth wave with said stepped rectangular wave, the period of said stepped rectangular wave being equal to the period of a complete frame reproduced on the screen of said cathode ray tube, the period of each vertical step of said stepped rectangular wave being equal to a period required for reproducing a single horizontal row of sub-frames on the screen of said cathode ray tube, one sub-frame corresponding to the image reproduced on said screen for representing the instantaneous amplitude of the output pulses furnished by a single voltage source under test as said "too high," "go" and "too low" indications, and the period of said vertical scan saw-tooth wave being equal to the vertical scan period of a single sub-frame.

14. The high speed voltage comparator as defined in claim 13 in which said horizontal sweep circuit includes a sub-frame horizontal scanning signal generator, a horizontal sweep stepped rectangular wave generator, and a horizontal sweep adder circuit combining said sub-frame scanning signal and said horizontal sweep stepped rectangular wave, the output of said adder being connected to said horizontal sweep control means, the period of said sub-frame horizontal scanning signal wave being determined by the number of horizontal sweep lines desired in said sub-frame and the resolving power of said screen, the period of the individual step in said horizontal sweep stepped rectangular wave being equal to the horizontal width of said sub-frame, the total number of the steps in said horizontal sweep stepped rectangular wave being equal to the number of the sub-frames contained in a single horizontal row of sub-frames as they are reproduced on said screen, and the total period of said horizontal sweep stepped rectangular wave being equal to the period of said single horizontal row of sub-frames.

No references cited.